(12) United States Patent
Bilger et al.

(10) Patent No.: US 7,890,530 B2
(45) Date of Patent: Feb. 15, 2011

(54) METHOD AND SYSTEM FOR CONTROLLING ACCESS TO DATA VIA A DATA-CENTRIC SECURITY MODEL

(75) Inventors: Michael P. Bilger, Arlington, TN (US); Hyman D. Chantz, Scarsdale, NY (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 12/025,832

(22) Filed: Feb. 5, 2008

(65) Prior Publication Data

US 2009/0198697 A1 Aug. 6, 2009

(51) Int. Cl.
*G06F 17/00* (2006.01)
(52) U.S. Cl. .................. 707/781; 707/791; 707/797
(58) Field of Classification Search .............. 707/781
See application file for complete search history.

(56) References Cited

U.S. PATENT DOCUMENTS

| | | | |
|---|---|---|---|
| 5,859,966 A * | 1/1999 | Hayman et al. ............... | 726/23 |
| 6,931,402 B1 * | 8/2005 | Pereira, III .................... | 1/1 |
| 7,143,066 B2 | 11/2006 | Shear et al. | |
| 7,171,412 B2 * | 1/2007 | Iline et al. .................... | 1/1 |
| 7,251,822 B2 * | 7/2007 | Agarwal et al. ............... | 726/1 |
| 7,266,553 B1 * | 9/2007 | Anderson et al. ............. | 1/1 |
| 2001/0025281 A1 * | 9/2001 | Hirayama ...................... | 707/9 |
| 2003/0023868 A1 * | 1/2003 | Parent ......................... | 713/200 |
| 2003/0110131 A1 * | 6/2003 | Alain et al. ................... | 705/51 |
| 2003/0167269 A1 * | 9/2003 | Gupta ........................... | 707/9 |
| 2004/0044655 A1 * | 3/2004 | Cotner et al. ................ | 707/3 |
| 2004/0064334 A1 * | 4/2004 | Nye ............................. | 705/1 |
| 2005/0028139 A1 | 2/2005 | Togahara | |
| 2005/0192824 A1 | 9/2005 | Schuetze et al. | |
| 2006/0004713 A1 * | 1/2006 | Korte et al. ................... | 707/3 |
| 2006/0143159 A1 * | 6/2006 | Chowdhury et al. ........... | 707/3 |
| 2006/0265385 A1 * | 11/2006 | Agrawal et al. ............... | 707/10 |
| 2006/0265599 A1 * | 11/2006 | Kanai ........................... | 713/182 |
| 2007/0011175 A1 * | 1/2007 | Langseth et al. .............. | 707/100 |

(Continued)

OTHER PUBLICATIONS

National Institute of Standards and Technology; Federal Information Processing Standards Publication 188 (FIPS 188) Standard Security Label for Information Transfer; Published Sep. 6, 1994; 27 pages.

*Primary Examiner*—Hung T Vy
*Assistant Examiner*—Binh V Ho
(74) *Attorney, Agent, or Firm*—Schmeiser, Olsen & Watts; William E. Schiesser

(57) ABSTRACT

A method and system for controlling access to data via a data-centric security model. A business data classification scheme is defined as a hierarchy that includes data types aligned with business operations. A data element is labeled with a data label. The data label includes multiple attributes associated with a data-centric security model. A first attribute is a data type of the data element. A second attribute includes security requirements. Data control rules are automatically generated for an enforcement of the security requirements. The enforcement grants or denies to a user an access to the data element via a predefined action. The enforcement is based on a predefined association among the predefined action, a predefined role that includes the user, the data type and, optionally, a purpose for performing the predefined action.

15 Claims, 10 Drawing Sheets

U.S. PATENT DOCUMENTS

| | | | |
|---|---|---|---|
| 2007/0067219 A1* | 3/2007 | Altberg et al. | 705/14 |
| 2007/0118512 A1* | 5/2007 | Riley et al. | 707/3 |
| 2007/0288446 A1* | 12/2007 | Frieder et al. | 707/4 |
| 2009/0037391 A1* | 2/2009 | Agrawal et al. | 707/3 |

* cited by examiner

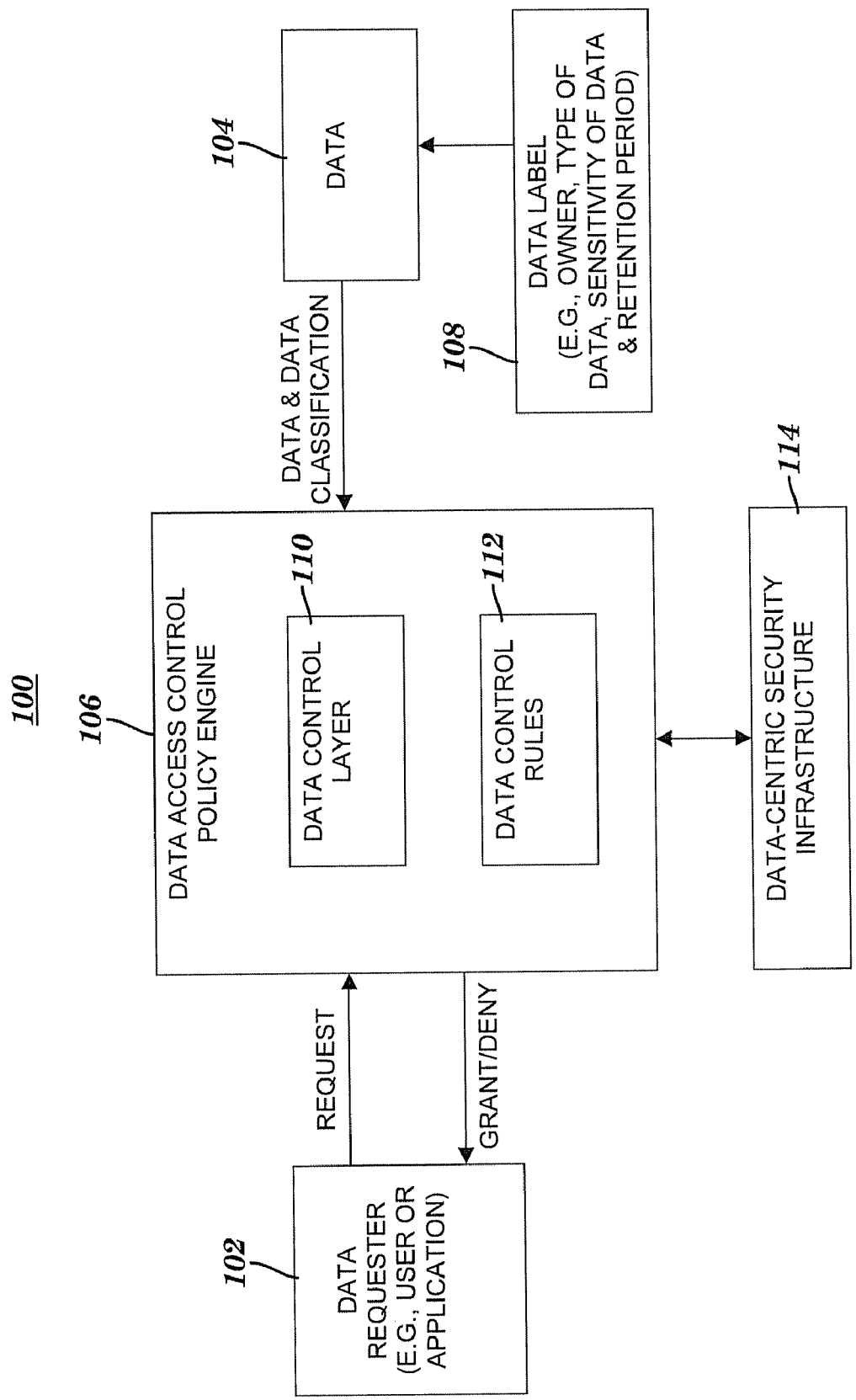

METHOD AND SYSTEM FOR CONTROLLING ACCESS TO DATA VIA A DATA-CENTRIC SECURITY MODEL

FIELD OF THE INVENTION

The present invention relates to a method and system for controlling access to data via a data-centric security model and to a data lifecycle management technique for improving data security, data classification, regulatory compliance, risk evaluation, risk reduction and regulatory response.

BACKGROUND OF THE INVENTION

Business owners and government entities face operational, financial, and/or regulatory risk due to an inability to adequately organize, understand, classify, evaluate and/or control rapidly-expanding amounts of data. This inability has reached a near-crisis level in many enterprises, due not only to technical and economic drivers, but also to an increasing number of regulatory requirements. These regulatory requirements include (1) Sarbanes-Oxley Act (SOX), which mandates demonstrable audit controls; (2) Gramm-Leach Bliley Act (GLB), which mandates restrictions on access to customer data; (3) Health Insurance Portability and Accountability Act (HIPAA), which mandates privacy of health-related records; and (4) California Data Security Breach Information Act (California SB-1386), which mandates disclosure to end users of breaches of California customer information, even if the data is not kept in California. In conventional data security models, each new control regime increases the amount of data that is required for business use by providing "uniform" but inappropriate protection to all assets. These known data security models rely on costly and numerous security services, mechanisms, or objects that are extrinsic to the data, or on the data itself. Conventional methods for addressing data organization, classification, evaluation, and control issues rely on non-integrated processes and manual intervention, which require large numbers of people skilled and knowledgeable in these data-related areas, elaborate accuracy and checking methods, and substantial amounts of time. Further, known data security methods have an inherent value dichotomy because a single data safeguard is protecting both high-value and low-value data. For example, a firewall that costs a considerable amount to deploy and maintain seeks to protect both high-value and low-value interior data, thereby providing too much protection to the data with the lowest value while being unable to provide enough protection to the data with the highest value. Still further, known data classification schemes classify information in bulk using static, inflexible, user-subjective classifications in a small range of categories (e.g., Confidential, Secret, Proprietary, etc.). Thus, there exists a need to overcome at least one of the preceding deficiencies and limitations of the related art.

SUMMARY OF THE INVENTION

The present invention provides a computer-implemented method of controlling access to data via a data-centric security model, comprising:

defining, via a computing system, a business data classification scheme as a hierarchy that includes a plurality of data types, the plurality of data types being aligned with a plurality of business operations in a many-to-one correspondence;

labeling, via the computing system, a data element with a data label, wherein the data label includes a plurality of attributes associated with a data-centric security model implemented in the computing system, wherein a first attribute of the plurality of attributes is a data type of the data element, the data type included in the plurality of data types, and wherein a second attribute of the plurality of attributes includes one or more security requirements of a plurality of security requirements; and generating, via the computing system, one or more data control rules providing an enforcement of the one or more security requirements, wherein the enforcement grants to a user or denies to the user an access to the data element via a predefined action on the data element, and wherein the enforcement is based on a predefined association among the predefined action, a predefined role that includes the user, the data type and, optionally, a purpose for performing the predefined action.

A system, computer program product, and a process for supporting computing infrastructure that provides at least one support service corresponding to the above-summarized method are also described and claimed herein.

Advantageously, the present invention uses business requirements to provide a specific, yet flexible, level of protection for each class of data that an enterprise holds. Further, the present invention provides an intuitive and cost-efficient way to protect information assets of an enterprise. Still further, the data-centric security approach disclosed herein provides an ability to update security policies in operational systems that is flexible enough to adapt to changing regulatory and business requirements in a dynamic business environment. Further yet, the present invention facilitates effective collaboration between members of an IT domain and a business domain and provides business leaders who are responsible for the protection of certain data a tool for influencing what data protection measures are deployed without requiring knowledge of security mechanism details underlying the deployed measures. In addition, reporting features of the present invention allows an organization to be in a state of continual audit readiness, thereby saving costs related to preparing for an audit. Moreover, the data-centric security approach disclosed herein provides cost-effective control of lifecycle management of data.

BRIEF DESCRIPTION OF THE DRAWINGS

FIG. 1A is a block diagram of a system for controlling access to data via a data access control policy engine, in accordance with embodiments of the present invention.

DETAILED DESCRIPTION OF THE INVENTION

1 Overview

Figure 1B:
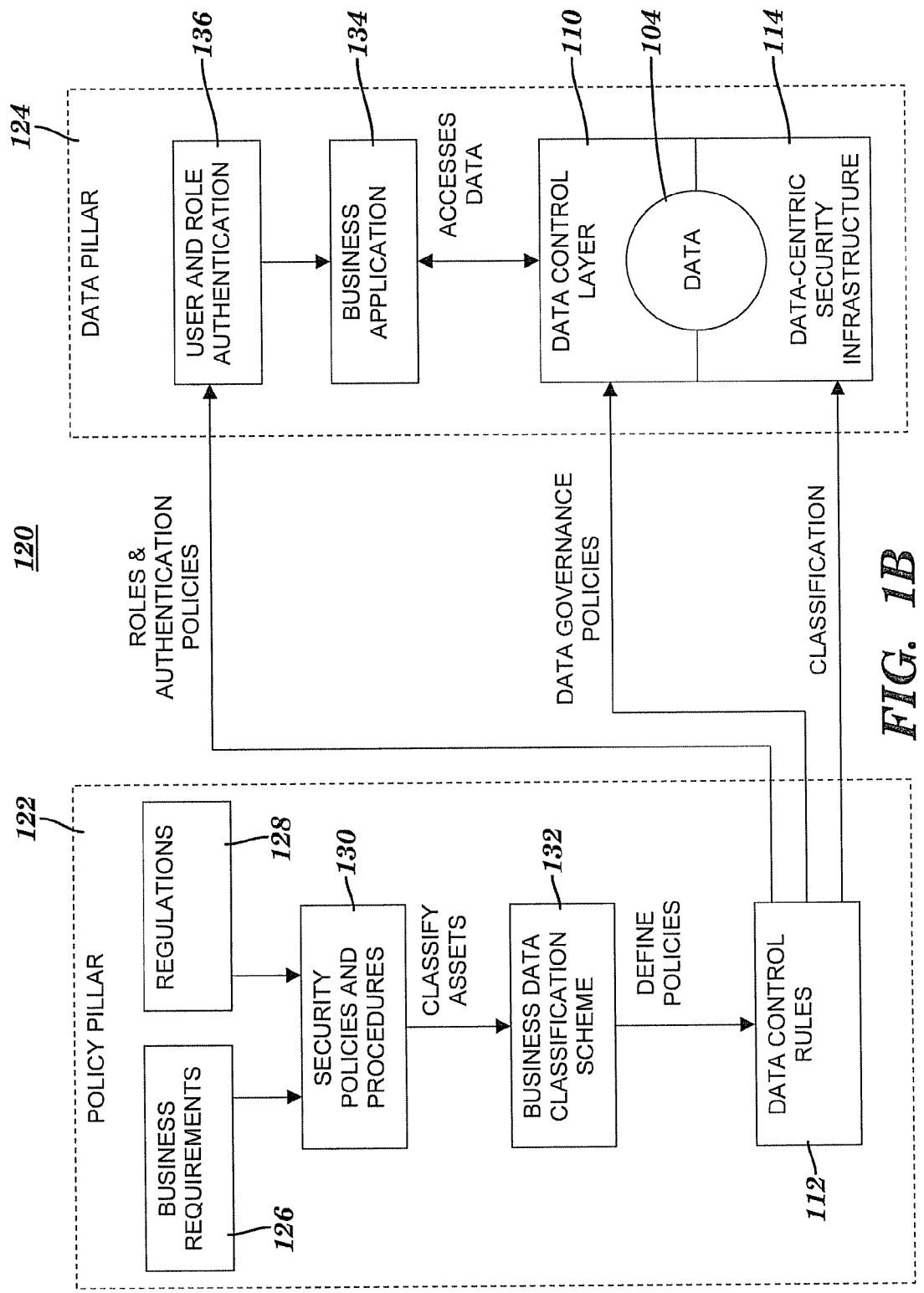
FIG. 1B is a block diagram of a data-centric security model that includes components of the data access control policy engine of FIG. 1A, in accordance with embodiments of the present invention.

The present invention provides a data-centric security model (DCSM) for data access and lifecycle data management. The DCSM provides an enterprise with the ability to (1) adequately distill and organize voluminous amounts of raw data into the information and knowledge that is necessary for business action; (2) efficiently understand and classify the contents of the enterprise's data, and measure and resolve security deficiencies; (3) properly control, monitor, and audit access to the data; and (4) implement and validate security safeguards in a manner commensurate with actual business risk and data value. The DCSM drives information technology (IT) security controls from a business requirements perspective by separating access control policies and data classification from data protection. For each class of data of an enterprise, the DCSM defines appropriate data security controls that reflect the business requirements that have been identified by the enterprise. Furthermore, as future security needs increase (e.g., due to additional regulatory requirements) or decrease (e.g., due to aging of time-sensitive information), the DCSM allows accurate resource tuning by dynamically and quickly changing the specific protection level of a data class, rather than acting upon each individual data element and without requiring a reconfiguration of an IT environment.

2 System For Accessing Data Via DCSM

FIG. 1A is a block diagram of a system for controlling access to data via a data access control policy engine, in accordance with embodiments of the present invention. System 100 includes a data requester (e.g., software application or an end user) that requests data 104 via a data access control policy engine 106. The data 104 is labeled by a data label 108 having multiple attributes that include, for example, the data's type, owner, sensitivity and retention period. Data access control policy engine 106 includes a data control layer (DCL) 110 and data control rules (DCRs) 112. Data access control policy engine 106 is built on top of a data-centric security infrastructure 114. Security infrastructure 114 provides services to DCL 110 that are defined in terms of DCRs 112. Services provided by security infrastructure 114 include, for example, identity management, access control, identification and authentication, confidentiality safe transport, Virtual Private Network (VPN), and data classification. DCL 110 receives policy statements that define data sensitivity, approved users and approved usage relative to data access, and translates the policy statements into a request to infrastructure 114 to provide appropriate services.

For example, a policy in DCRs 112 states that data of type X that must be securely transported is translated into a request from DCL 110 to a secure transport service of security infrastructure 114. The secure transport service may rely on a protocol such as Secure Sockets Layer (SSL), which makes use of certificate-based authentication, but these protocol details are hidden from DCL 110. If data requester 102 is a mobile employee, then the safe transport requirement may be satisfied, for example, by using a tunneled VPN connection provided by infrastructure 114, and which is again a detail that is hidden from DCL 110.

FIG. 1B is a block diagram of a data-centric security model that includes components of the data access control policy engine of FIG. 1A, in accordance with embodiments of the present invention. DCSM 120 includes a policy pillar 122 and a data pillar 124. Policy pillar 122 starts by summarizing business requirements 126 of an enterprise and legislative regulations 128 that are addressed by security architecture. Both business requirements 126 and regulations 128 are unified into a description of desired security policies and procedures 130 for different classes of data. The corporate and regulatory policies express data-handling policies in terms of requirements, both internal and external to the enterprise, which for example, may dictate obligations for data owners or state retention periods for data.

The security classes are used to define an overall business data classification (BDC) scheme 132, which includes a hierarchy of classes of data. The hierarchy of BDC scheme 132 can group data organizationally or functionally. In one embodiment, the high-level portion of the hierarchy of BDC scheme 132 is consistent with business operations such as financial, legal, human resources, product development, etc. The BDC scheme 132 may be used as a replacement for or in combination with existing schemas. Data 104 (a.k.a. assets) is classified by the BDC scheme according to predefined criteria such as security, owner, and retention time. The data has one or more well-defined owners, typically expressed in terms of a business purpose or business line function. The goal of the data classification is to identify the overall data governance that needs to be implemented. The data classification is adhered to during capture, transmission and storage of data 104. The data classification and the policy rules are then encoded into DCRs 112. The DCRs represent unified data-handling policies expressed in terms of BDC scheme 132. The DCRs are used to establish appropriate security policies and practices to support the enterprise's data-handling policies.

Data pillar 124 of DCSM 120 rests on security infrastructure 114 that provides basic security functions such as perimeter defense, protection of data at rest, disclosure rules, and/or encapsulation of data during transmission. DCSM 120 does not depend upon any specific security technology or product included in security infrastructure 114. Security infrastructure 114 may be modified without affecting data control layer 110.

Data 104 is classified in terms of BDC scheme 132. Access to data 104 and permissible actions on the data are controlled by DCL 110. DCL 110 is designed to implement the policies expressed in DCRs 112, and relies upon security services in the security infrastructure 114. The fine-grained security controls of DCL 110 can implement a wide range of data control rules. DCL 110 obtains the access context (e.g., authenticated users) and uses this context to decide whether data 104 can be accessed. Infrastructure 114 is configured to support the security policies that have been derived from DCRs 112. Business applications 134 access the data through DCL 110, which uses data governance policies. A role-based authentication component 136 identifies users and assigns roles to the users based on authentication policies provided by policy pillar 122. In order to enable protection with only minimal changes to applications 134, an application abstraction model is leveraged to map terminology between application-specific contexts to the data governance rules. The mapping performed by the application abstraction model enables DCL 110 to understand each application-specific context without requiring that the context is adapted to the security policies 130.

DCSM 120 provides layers of protection that are consistent with corporate/organization policy and regulations. Corporate standards are used to restrict data access to authorized users. The sensitivity of data 104 dictates the appropriate protection measures at every phase of a data request from application 134. The security services of infrastructure 114 are utilized to protect critical data, and the corporate risk acceptance plan determines the appropriate use of technical safeguards at the infrastructure and application layers.

Components of DCSM 120 may be implemented, for example, (1) in an integrated database, where the DCSM acts as a core security controller for both data security and access; (2) as a shrink-wrapped standalone data security, compliance and classification engine; or (3) as a service to remediate and enhance existing data classification constructs.

DCSM 120 is thus dependent on an enterprise-wide BDC scheme 132, consistent deployment of DCL 110 at the point of access to data 104, and adherence to data classification during capture, transmission and storage. Such adherence to data classification indicates that data labels are persistent and must reside with the data that is labeled.

3 Process Of Accessing Data Via DCSM

Figure 2:
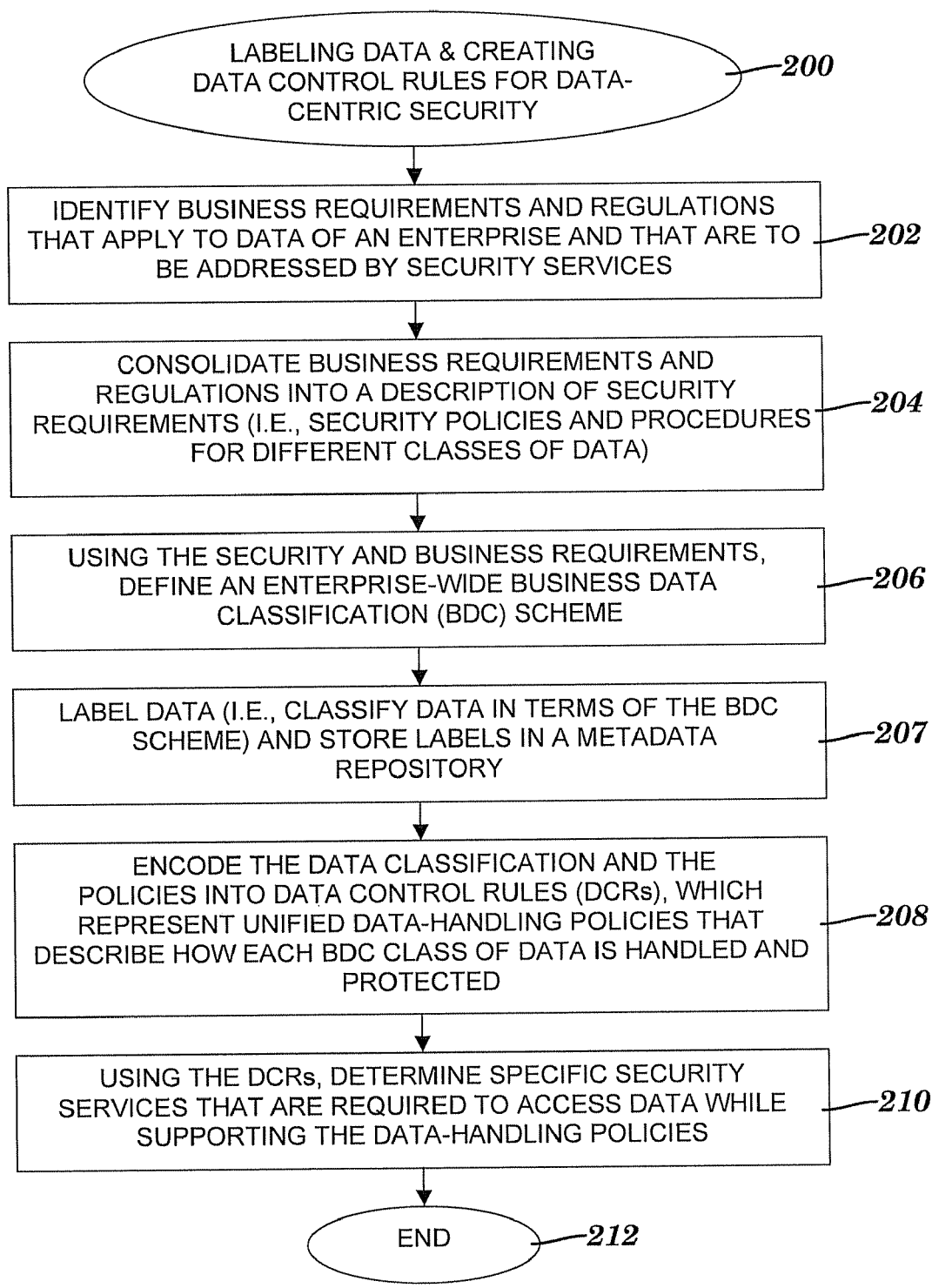
FIG. 2 is a flow diagram of a data access control process that includes data labeling and data control rule creation and that is implemented by the system of FIG. 1A and the data-centric security model of FIG. 1B, in accordance with embodiments of the present invention.

FIG. 2 is a flow diagram of a data access control process that includes data labeling and data control rule creation and that is implemented by the system of FIG. 1A and the data-centric security model of FIG. 1B, in accordance with embodiments of the present invention. The data access control process begins at step 200. In step 202, business requirements 126 (see FIG. 1B) and regulations 128 (see FIG. 1B) that apply to data 104 (see FIG. 1B) and that are to be addressed by security infrastructure 114 (see FIG. 1B) are identified. In step 204, business requirements 126 (see FIG. 1B) and regulations 128 (see FIG. 1B) are consolidated into a description of security requirements (i.e., security policies and procedures) for different classes of data. In step 206, using the security and business requirements of steps 202 and 204, an enterprise-wide business data classification scheme 132 (see FIG. 1B) is defined. Steps 202, 204 and 206 are manually performed by, for example, a compliance officer, data owner, system administrator, business process owner, or other personnel.

In step 207, data access control policy engine 106 (see FIG. 1A) automatically labels data 104 (see FIG. 1A) with data labels, where each data label includes multiple attributes. The multiple attributes of a data label for a particular data element of data 104 (see FIG. 1A) are identified in step 207 by determining a business data classification of the data element and business-oriented security requirements that describe how the classification of the data element is to be handled and protected. Furthermore, in step 207, the data labels are stored in a metadata repository (not shown).

Attributes of the data label related to the business data classification include, for example: origin, ownership, custodianship and type. An origin attribute includes a description of where the data element being labeled physically and logically originated. An ownership attribute is a description of who owns the data. Custodianship attributes include descriptions of: (1) who controls the data element being labeled; (2) who holds the data element; (3) who or what can modify the data element; (4) who or what can delete the data element; and (5) conditions under which data modification and deletion are allowed. Type attributes include a description of the data element's type and sensitivity.

Attributes of the data label related to the business-oriented security requirements include, for example: usage, residence, volatility, safeguarding and communicability, quantified risk, regulatory character, and disclosure. Usage attributes include descriptions of: (1) who or what is permitted to use the data element; (2) the purpose for which the data element is permitted to be used; (3) whether or not usage of the data element can be shared; and (4) conditions under which the usage of the data element can be shared. A residence attribute includes a description of where the data element is to be kept. Volatility attributes include descriptions of the length of time the data element is to be kept and how the value of the data element increases or decreases over time. A safeguarding and communicability attribute includes a description of whether or not the data element needs to be safeguarded when the data element is at rest and being backed up and during the data element's use. Quantified risk attributes include descriptions of (1) the enterprise-wide risk implications of the data element alone or in conjunction with other data and (2) the quantified risks for improper disclosure or modification of the data element. A regulatory character attribute includes a description of the data element's specific regulatory or litigation impact and the applicable jurisdictions. Disclosure attributes include descriptions of: (1) how the data element can be disclosed; (2) what subset of data can be disclosed; (3) what protection must be implemented for the data element; and (4) whether the data element needs to be distorted or watermarked.

In one embodiment, the data labeling of step 207 enforces a streamlined integration of automated, semi-automated, and manual data categorization. The data labeling is based on business-related risk, threat, and cost-effectiveness considerations. Automatic data labeling may also be attained by means of data inspection and matching criteria, as well as application input templates.

The data labeling of step 207 is streamlined and based on the risk posture being viewed as originating in the asset, per se (i.e., in the data), rather than originating in the concept of users, perimeters, storage, etc. Prior to any quanta of data being defined, the data is labeled regarding its potential for viewing, transportation, storage and other compensating controls. These compensating controls may be (1) manually specified by a data originator or designated custodian, or (2) automatically characterized to conform to some regulatory imperative or business risk. A prime advantage is that the compensating controls noted on the data in bulk may be changed to reflect evolving regulatory environments. In addition, the data labels provide for anonymization of data to various sources.

In step 208, manually or automatically provided policy statements define job roles (a.k.a. organizational roles or user categories) that are permitted to perform actions related to data (e.g., access data) in specific BDC classes (a.k.a. data categories) and optionally define specific purposes for which the actions are permitted to be performed. Herein, a job role that is permitted to perform an action refers to one or more users included in the job role, where the one or more users are permitted to perform the action. In one embodiment, a user utilizes a software-based policy statement authoring tool to generate the policy statements in step 208 by selecting job roles, actions, BDC classes and purposes from predefined lists. For example, a user utilizes the policy statement authoring tool to generate the statement: "Customer service reps and managers may collect and use name and social security number for the purpose of confirming identity." In this example, the job roles are "customer service reps" and "managers"; the BDC classes are "name" and "social security number"; the actions are "collect" and "use"; and the purpose is "for the purpose of confirming identity."

The policy statement authoring tool checks the grammar of each policy statement provided in step 208. If a grammar error is detected in step 208, the authoring tool corrects the grammar of the policy statement or presents options to the user for correcting the grammar.

Also in step 208, data access control policy engine 106 (see FIG. 1A) parses each of the provided policy statements and automatically generates DCRs 112 (see FIG. 1B) by automatically encoding the data classifications and the policy statements as enforceable statements in an access control policy language such as XACML. Thus, each DCR generated in step 208 defines one or more job roles that are permitted to perform one or more actions related to data in one or more specific BDC classes and optionally defines one or more specific purposes for which the one or more actions are permitted to be performed. In another embodiment, DCRs 112 are generated manually in step 208.

The DCRs generated in step 208 represent unified data-handling policies that describe how each class of BDC scheme 132 (see FIG. 1B) is handled and protected. For example, a DCR generated in step 208 indicates that a particular BDC class needs to be protected.

In step 210, DCL 110 (see FIG. 1B) uses the DCRs generated in step 208 to determine specific security services or functions that are required to access data 104 (see FIG. 1B) while supporting the data-handling policies represented by the DCRs generated in step 208. For example, step 210 determines that encryption services are required to apply the protection for a BDC class, where the protection is indicated by a DCR generated in step 208.

In one embodiment, the policy statement authoring tool generates a report that indicates which job roles have access to which BDC classes and for which purposes. This generated report facilitates placing an enterprise into a state of continual audit readiness. The data access process of FIG. 2 ends at step 212.

In one embodiment, the policy statement authoring tool includes a conflict analysis capability, which identifies redundant policy statements and/or policy statements that conflict with one another so that a user may correct the redundancies and/or conflicts.

4 Applying Data Control Rules

Figure 3:
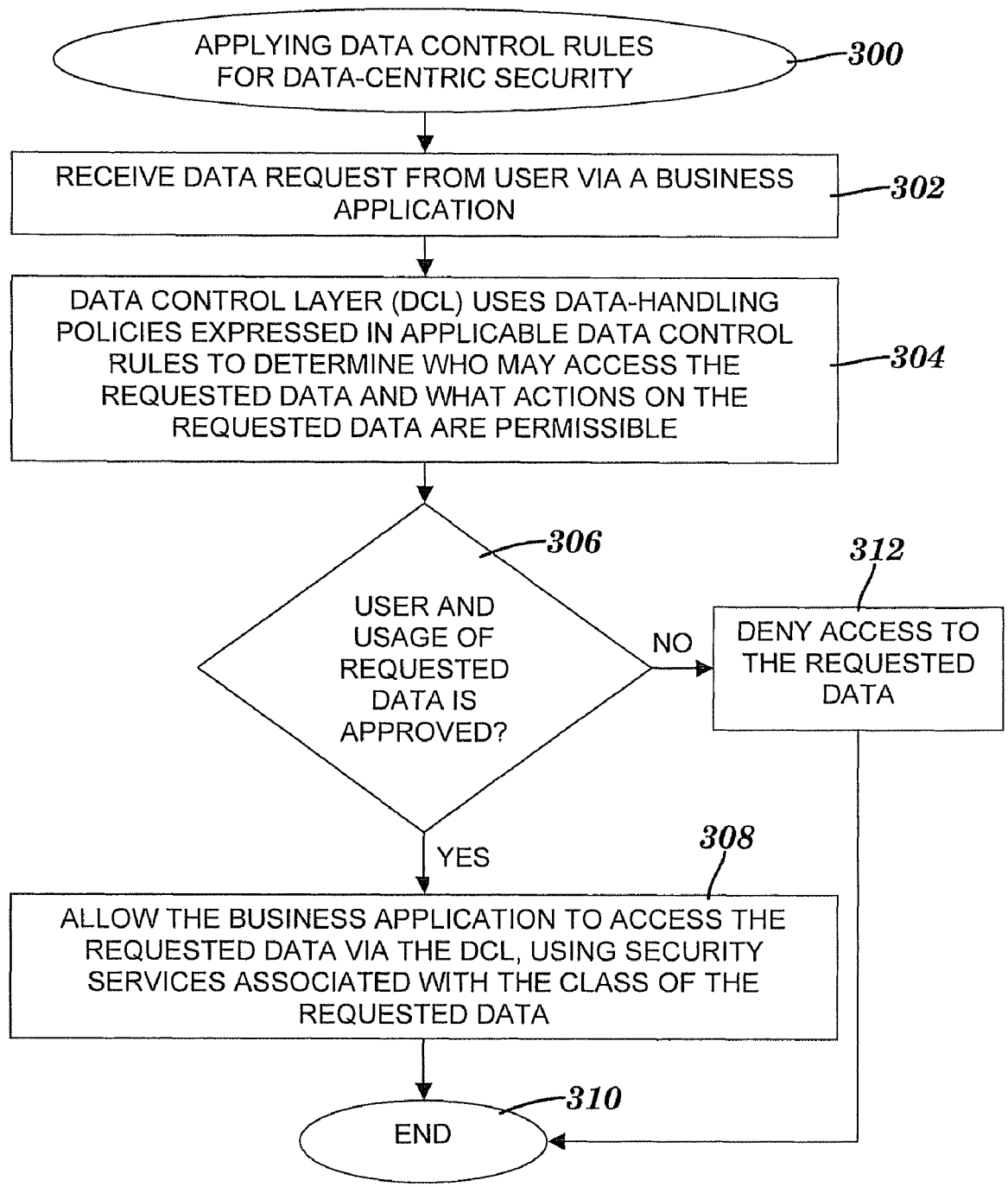
FIG. 3 is a flow diagram of applying the data control rules created in the process of FIG. 2, in accordance with embodiments of the present invention.

FIG. 3 is a flow diagram of applying the data control rules created in the process of FIG. 2, in accordance with embodiments of the present invention. The process of applying data control rules begins at step 300. In step 302, data access control policy engine 106 (see FIG. 1A) receives a data request from a user via a business application 102 (see FIG. 1A). The data request is for a particular usage of a data element in data 104 (see FIG. 1A). In step 304, DCL 110 (see FIG. 1A) uses data handling policies expressed in applicable DCRs 112 (see FIG. 1A) to determine who is permitted to access the requested data element and what actions on the requested data element are permissible. In inquiry step 306, DCL 110 (see FIG. 1A) determines whether or not to approve the user requesting the data and the usage of the data. If DCL 110 (see FIG. 1A) approves the user and the usage in step 306, then in step 308, data access control policy engine 106 (see FIG. 1A) allows the business application to access the requested data element via DCL 110 (see FIG. 1A) using security services that are associated with the class of the requested data element and that are provided by security infrastructure 114 (see FIG. 1A). Following step 308, the process of applying data control rules ends at step 310.

If DCL 110 (see FIG. 1A) does not approve the user or the usage in step 306, then in step 312, the business application is denied access to the requested data and the process of FIG. 3 ends at step 310.

5 Lifecycle Data Management

Figure 4:
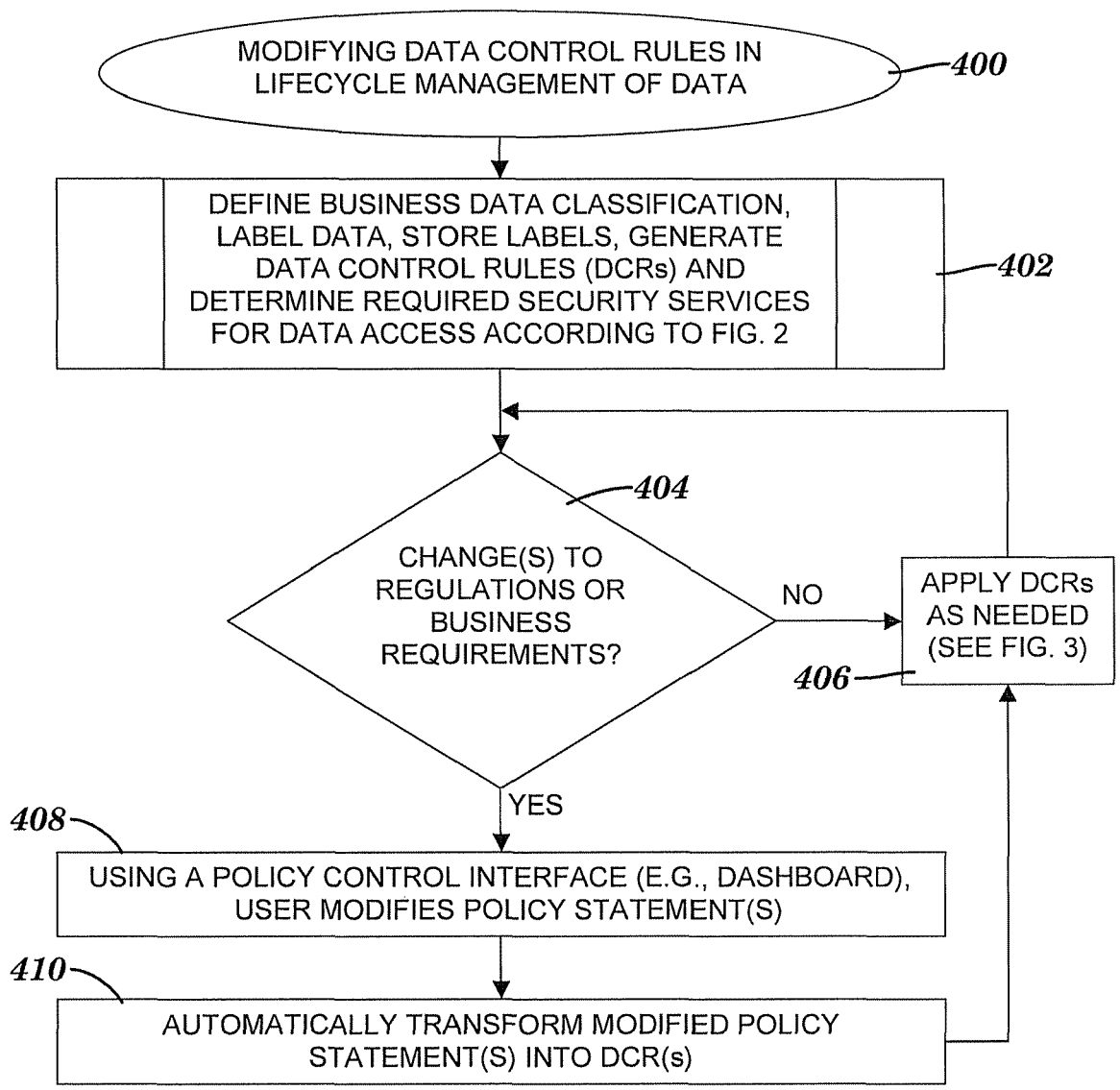
FIG. 4 is a flow diagram of modifying data control rules in a lifecycle management of data whose access is being controlled by the process of FIG. 2, in accordance with embodiments of the present invention.

FIG. 4 is a flow diagram of modifying data control rules in a lifecycle management of data whose access is being controlled by the process of FIG. 2, in accordance with embodiments of the present invention. The process of modifying data control rules begins at step 400. In step 402, the business data classification scheme 132 (see FIG. 1B) is defined, data 104 (see FIG. 1B) is labeled, DCRs 112 (see FIG. 1B) are generated and required security services for accessing data 104 (see FIG. 1B) are determined according to the process of FIG. 2. Inquiry step 404 determines whether business requirements 126 (see FIG. 1B) and/or regulations 128 (see FIG. 1B) are changed. If no business requirement and regulation changes are determined by step 404, then in step 406, system 100 (see FIG. 1A) applies DCRs as needed according to the process of FIG. 3 and the process of FIG. 4 repeats starting at step 404.

If any business requirement and/or regulation changes are determined by step 404, then in step 408, a user of system 100 (see FIG. 1A) modifies one or more data-handling policy statements originally represented by one or more DCRs in step 208 (see FIG. 2). The user modifies the one or more data-handling policy statements by utilizing a policy control interface (not shown) provided by system 100 (see FIG. 1A) (e.g., a computer-implemented dashboard). In step 410, data access control policy engine 106 (see FIG. 1A) automatically transforms the one or more policy statements modified in step 408 into one or more DCRs 112 (see FIG. 1B), which are enforceable statements in an access control policy language such as XACML. Step 410 includes an automatic or semi-automatic correction of any grammar problems in the modified policy statement(s) and an automatic parsing of the modified policy statement(s).

Following step 410, DCRs 112 (see FIG. 1B), which include the newly generated DCRs of step 410, are applied as needed in step 406 according to the process of FIG. 3, and the process of FIG. 4 repeats starting at step 404. The process of FIG. 4 described above continues for the lifecycle management of data 104 (see FIG. 1B).

6 Tangible DCSM Implementation Architecture

In this section, the core technical components needed to implement DCSM 120 (see FIG. 1B) are described.

6.1 Design of Classification and Policy

The first phase of DCSM implementation is an initial execution of policy pillar 122 (see FIG. 1B). This first phase includes identifying the types of critical data that exist in an enterprise as well as business requirements 126 (see FIG. 1B) and regulatory requirements 128 (see FIG. 1B) of the data (see step 202 of FIG. 2), which are consolidated into security requirements 130 (see FIG. 1B) of the data (see step 204 of FIG. 2). Based on consolidated security requirements 130 (see FIG. 1B), specific security requirements for each category of data are derived. In order to implement the required protection, the security staff then designs policies for the systems that handle critical data that meet the security requirements put forward for each of the categories.

6.2 Migration: Classifying Business Data

The first technical challenge of DCSM implementation is to classify data. This challenge requires that data 104 (see FIG. 1B) handled by an enterprise is associated with classifications. This classification of data 104 (see FIG. 1B) is performed on several levels of refinement. The most coarse-grained approach is to label security zones with data classifications the zones are allowed to process. The next finer-grained labeling is to label systems and channels with data classifications the systems and channels are permitted to process. The next refinement is to label databases and channels in detail, which requires, for example, that the classification of the columns of a database is determined and stored. Finally, the most fine-grained approach is to label individual instances with data classifications (e.g., identify which files are classified confidential).

Figure 5A:
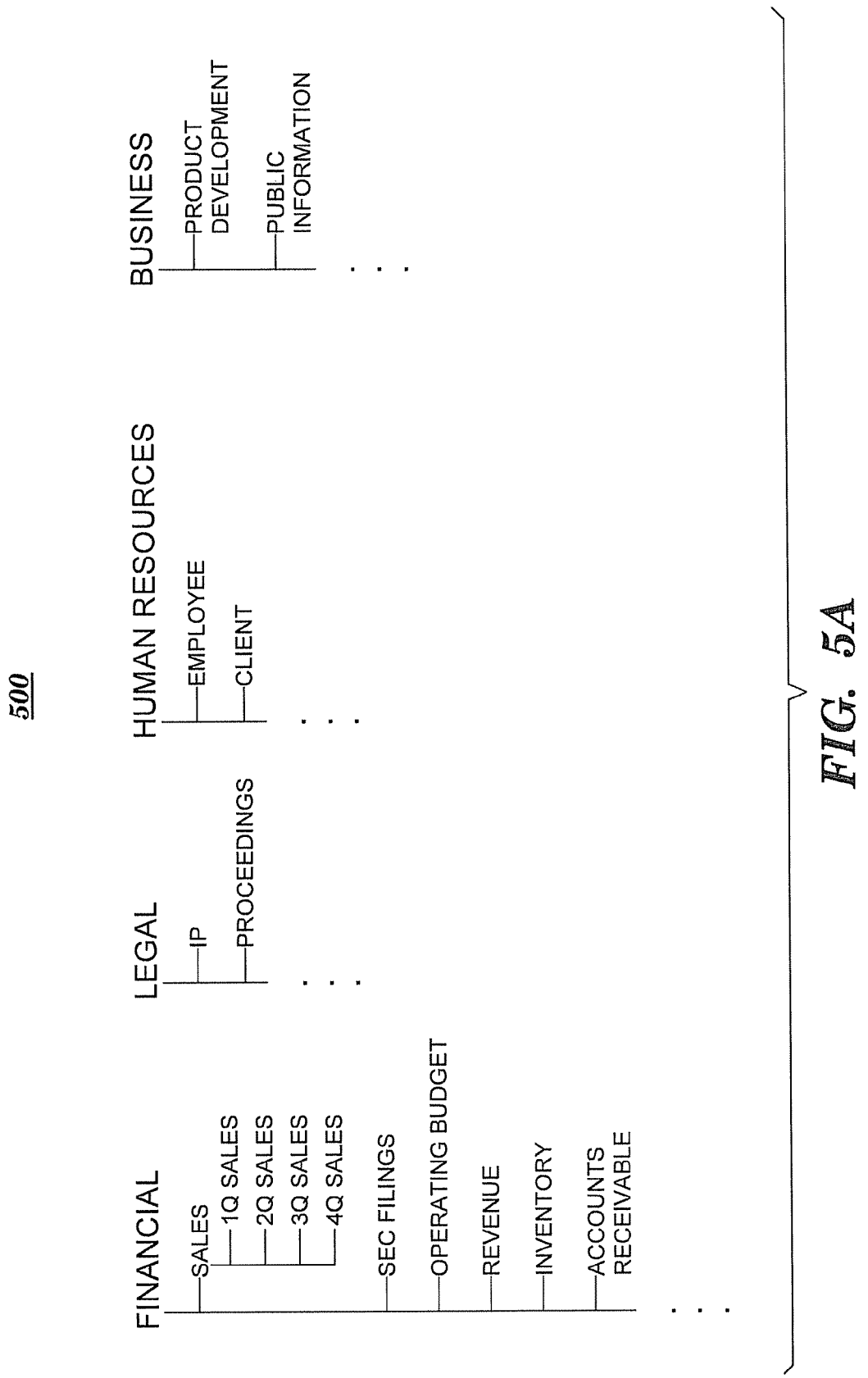
FIG. 5A is an example of a business data classification scheme defined in the process of FIG. 2, in accordance with embodiments of the present invention.
Figure 5B:
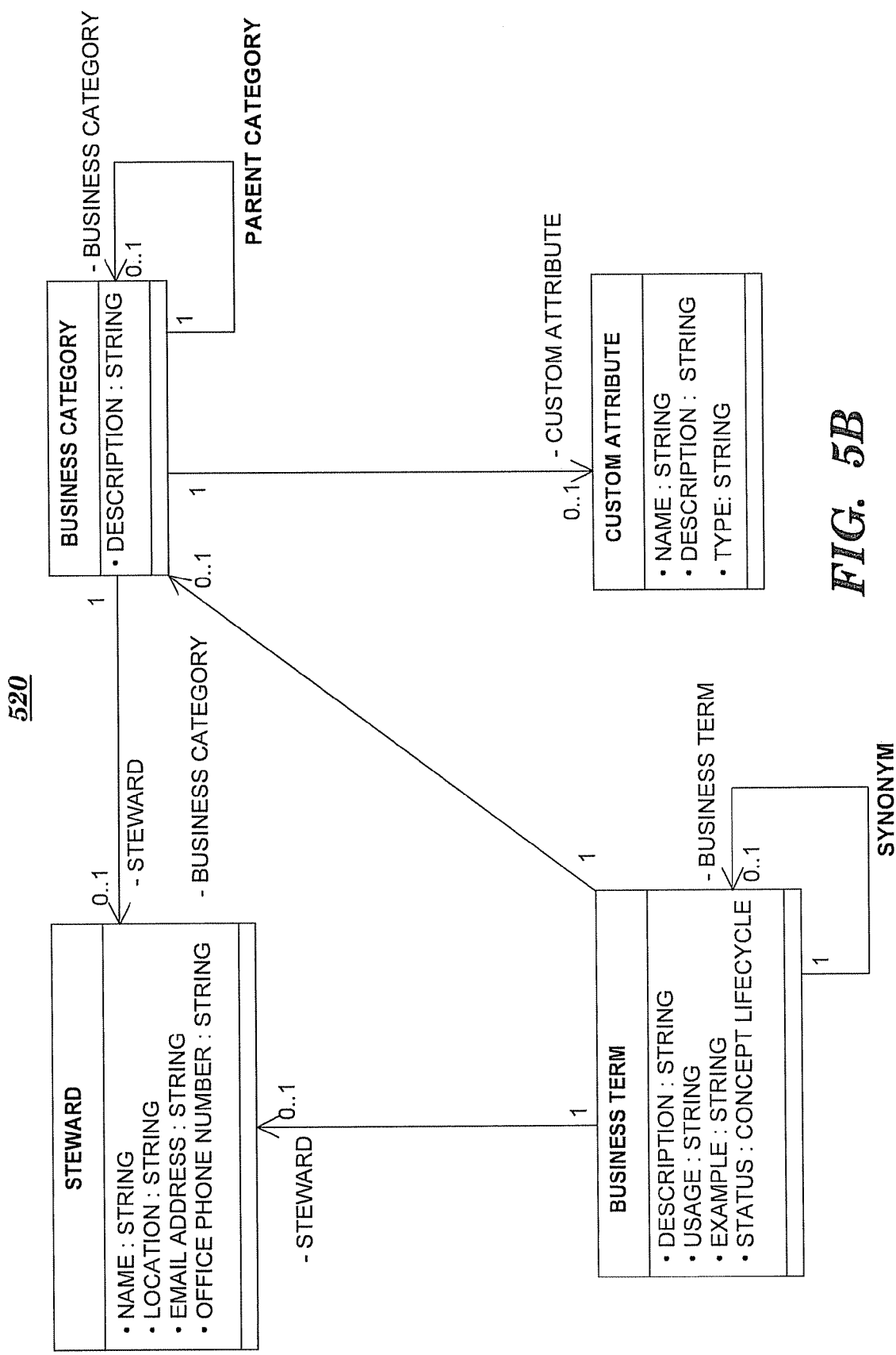
FIG. 5B is an example of a multiple attribute data label that labels data in the process of FIG. 2, in accordance with embodiments of the present invention.

The basis of DCSM 120 (see FIG. 1B) is the ability to classify data according to a common data classification schema (i.e., business data classification scheme 132 of FIG. 1B). A goal of DCSM 120 (see FIG. 1B) is to provide a direct linkage between security services and the data of business processes. Thus, the data classification of DCSM 120 (see FIG. 1B) must be defined in terms of business data as opposed to any existing classification schemes pertaining to security, because in the DCSM, security requirements are subordinate to the business value of data. Therefore, traditional sensitivity labels commonly associated with Mandatory Access Control (MAC) are unsuitable to form the basis of data classification schema 132 (see FIG. 1B). In military security models based on MAC policies, information assurance policies dictate data handling practices independently of the use of data in various processes. In a commercial setting, however, the military security approach is inappropriate. A data model based on the operation of business processes can be linked "downwards" in the enterprise architecture to security services, and also linked "upwards" to the business modeling and architecture layers. Such a business data classification scheme 132 (see FIG. 1B) provides closer affinity to corporate security policies for data classification in agreement with business processes, and leads to increased security awareness for employees who can directly understand the business purpose of data the employees are handling. Also, such a data model (i.e., business data classification scheme 132 of FIG. 1B) eases the definition of inter-enterprise agreements for data exchange. An example of the BDC scheme 132 (see FIG. 1B) is shown as hierarchy 500 in FIG. 5A. A particular data element of data 104 (see FIG. 1B) is associated with one of the aforementioned data classifications via an attribute of a multiple attribute data label. Such a data label with multiple attributes is illustrated by data label 520 in FIG. 5B.

Figure 6A:
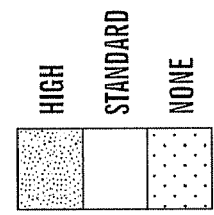
FIG. 6A is a map of types of data organized by business data classifications defined in the process of FIG. 2, together with levels of protection associated with the types of data, in accordance with embodiments of the present invention.

FIG. 6A is a map of types of data organized by business data classifications defined in the process of FIG. 2, together with levels of protection associated with the types of data, in accordance with embodiments of the present invention. Map 600 includes the following business data classifications: financial, legal, human resources (HR)/personally identifiable information (PII), and trade secret. Map 600 also indicates three levels of protection: high, standard and none. The "high" level in map 600 indicates the need to employ the highest data security safeguards for the associated types of data. For example, the client list data in the financial classification of map 600 is associated with the highest data security safeguards. The "standard" level in map 600 indicates the need for standard data security safeguards. The "none" indicator in map 600 indicates that no data security precautions are necessary. In one embodiment, data access control policy engine 106 (see FIG. 1A) generates map 600.

Map 600 facilitates a determination that a change in a data type's protection level is necessary. For example, a Chief Financial Officer (CFO) reviews map 600 and determines that the operating budget (i.e., op budget in map 600) needs to be changed from a standard level of protection to a high level of protection. This determination by the CFO is completed without the CFO having knowledge of any details of data protection mechanisms such as access control lists, encryption, hashing mechanisms, integrity checks, etc. In this example, a member of the enterprise's IT domain translates the CFO's determination regarding the operating budget into technical requirements.

Figure 6B:
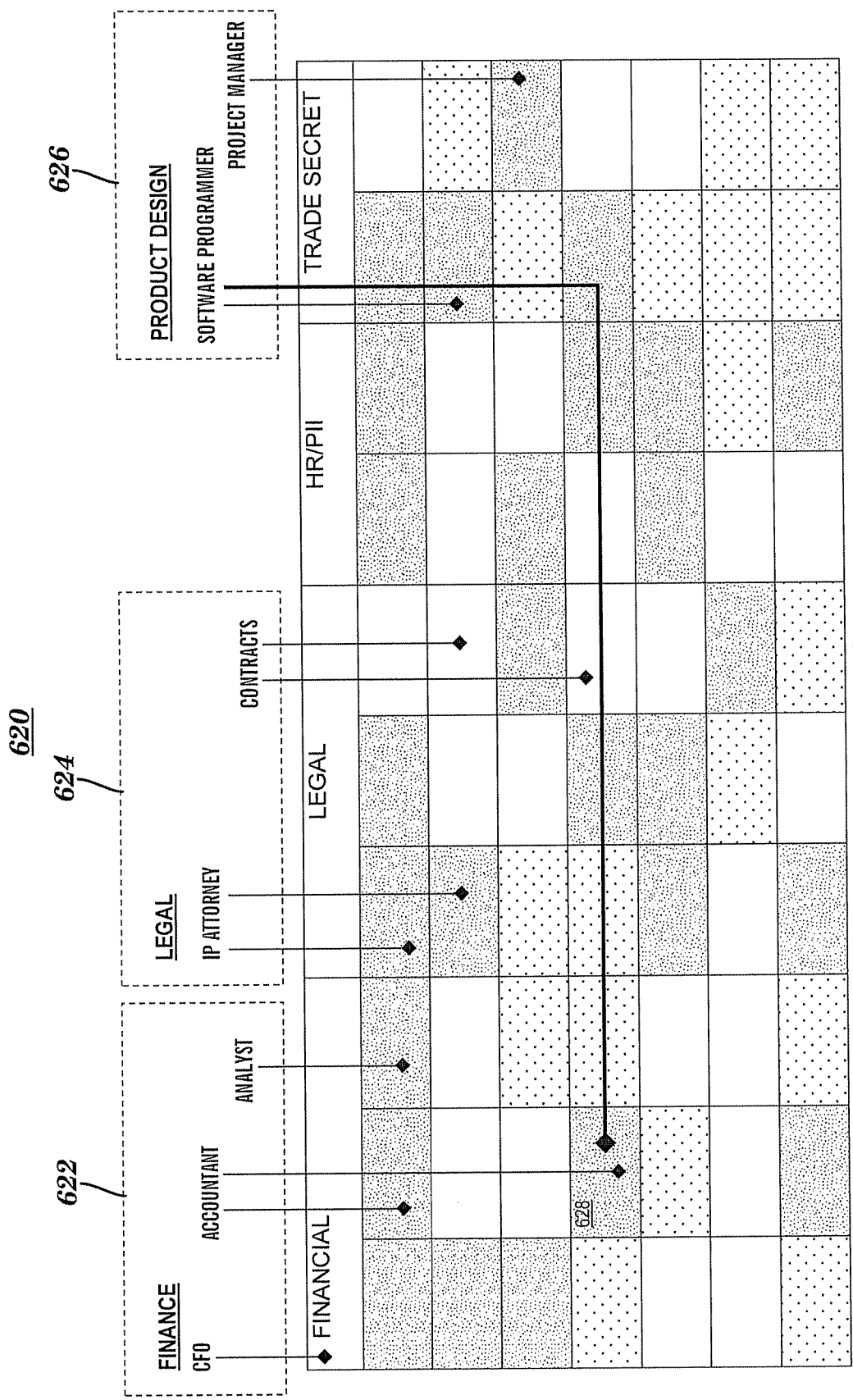
FIG. 6B is a map of roles that have access to different types of data organized by business data classifications defined in the process of FIG. 2, in accordance with embodiments of the present invention.

FIG. 6B is a map of roles that have access to different types of data organized by business data classifications defined in the process of FIG. 2, in accordance with embodiments of the present invention. Map 620 maps job roles to the types of data that are accessible by the job roles to create a visual representation of a security posture within an organization, In one embodiment, data access control policy engine 106 (see FIG. 1A) generates map 620. In map 620, CFO, accountant and analyst job roles are placed in a finance category 622; intellectual property (IP) attorney and contracts job roles are placed in a legal category 624; and software programmer and project manager job roles are placed in a product design category 626. Each type of data that is accessible by a particular job role is indicated by a line from the block representing the type of data to the job role. For simplicity, the types of data are not displayed in the blocks of map 620, but could include the data types shown in map 600 (see FIG. 6A).

For example, a CFO reviews map 620 to determine that a software programmer has access to financial data 628, as indicated by the thick line connecting the block representing financial data 628 and the software programmer in product design category 626. In this example, the CFO determines that the software programmer is currently writing a sales trend analysis program and therefore currently needs access to financial data 628, but the software programmer's access to data 628 needs to be revoked six months from now because the sales trend analysis program is completed, deployed and running. The CFO makes this determination in this example without requiring knowledge of details of the grant of access to data 628, such as update/delete authorities provided to the software programmer on a per file basis.

6.3 Authentication and Authorization

Several components are needed in DCSM 120 (see FIG. 1B) to provide authentication, authorization and disclosure control. An authorization component asks the user for authentication and issues corresponding user credentials. A monitor component observes accesses to critical data and requests authorization to perform the desired operations. A role-based data access component decides whether a policy allows or denies a certain operation on a given data category based on the user's job role. The role-based data access component obtains the job roles of the user accessing a data category, the business context of such a business process, and the operations to be performed on the data. The aforementioned authorization and role-based data access components are illustrated in FIG. 1B by user and role authentication component 136. The rules-based data access control policy engine 106 (see FIG. 1A) then returns a decision whether the access to data is granted or denied. The rules-based data access control policy engine 106 (see FIG. 1A) also determines if transformations need to be performed on the data before release. Depending on the criticality of the data, authorization may either prevent unauthorized access or generate corresponding non-compliance events.

6.4 Policy Management

DCSM 120 (see FIG. 1B) is based on a new federated approach to policy management. The core idea is that policy design can be federated between multiple authorities inside an enterprise. From a compliance perspective, the overall enterprise enforces certain baseline policies. As a consequence, the security team defines a baseline policy for an enterprise. This baseline policy defines the business classification together with policy rules that reflect mandatory rules for handling these categories as well as recommendations that the department may choose to ignore. Each department then refines the policy by choosing which subset of the recommendations is appropriate for the given department. Next, any parts of the recommendations that do not fit the local needs are refined by adding new rules. The policy management system then ensures that these local refinements do not violate the mandatory enterprise-wide policy.

6.5 Cross-Enterprise Transactions

Enterprises increasingly move towards value networks in which groups of equal partners form short-term coalitions that are similar to virtual enterprises. Each enterprise in a value network may concentrate on its core competency while most transactions cross organizational boundaries. The core security requirement for such cross-enterprise transactions is to seamlessly protect the data no matter where the data is correctly located. From a data-centric approach provided by DCSM 120 (see FIG. 1B), this protection of data requires that labels be transmitted and that corresponding security requirements be globally enforced. In enabling such a unified enforcement in a heterogeneous environment, it is to be noted that each partner enterprise uses different policy implementations. The only common requirement is that the partner enterprises follow a data-centric approach provided by DCSM 120 (see FIG. 1B) and that these policy implementations satisfy the given requirement.

6.6 Infrastructure Security

Data-centric security provided by DCSM 120 (see FIG. 1B) requires a secure infrastructure. If servers and systems are affected by worms and viruses, the ability to enforce a given policy is limited. As for all other secure systems, the higher the security requirements on the protection of data, the higher the security requirements of infrastructure 114 (see FIG. 1B). As a consequence, any implementation of data-centric security requires a basic level of system security that includes perimeter defense, patch management, and virus and intrusion detection. Nevertheless, data-centric security provided by DCSM 120 (see FIG. 1B) can reduce the cost of infrastructure security.

By labeling data, the data-centric security disclosed herein enables enterprises to actively assess and manage their information assets. That is, an enterprise knows the business value of the data handled by different systems on different networks. As a consequence, an enterprise splits its infrastructure into different zones that correspond to the business value of the data that is handled within each zone. For zones that handle only low-value data, infrastructure protection is reduced to a minimum, thereby allowing investments to be focused on zones handling higher-value data.

7 Computing System

Figure 7:
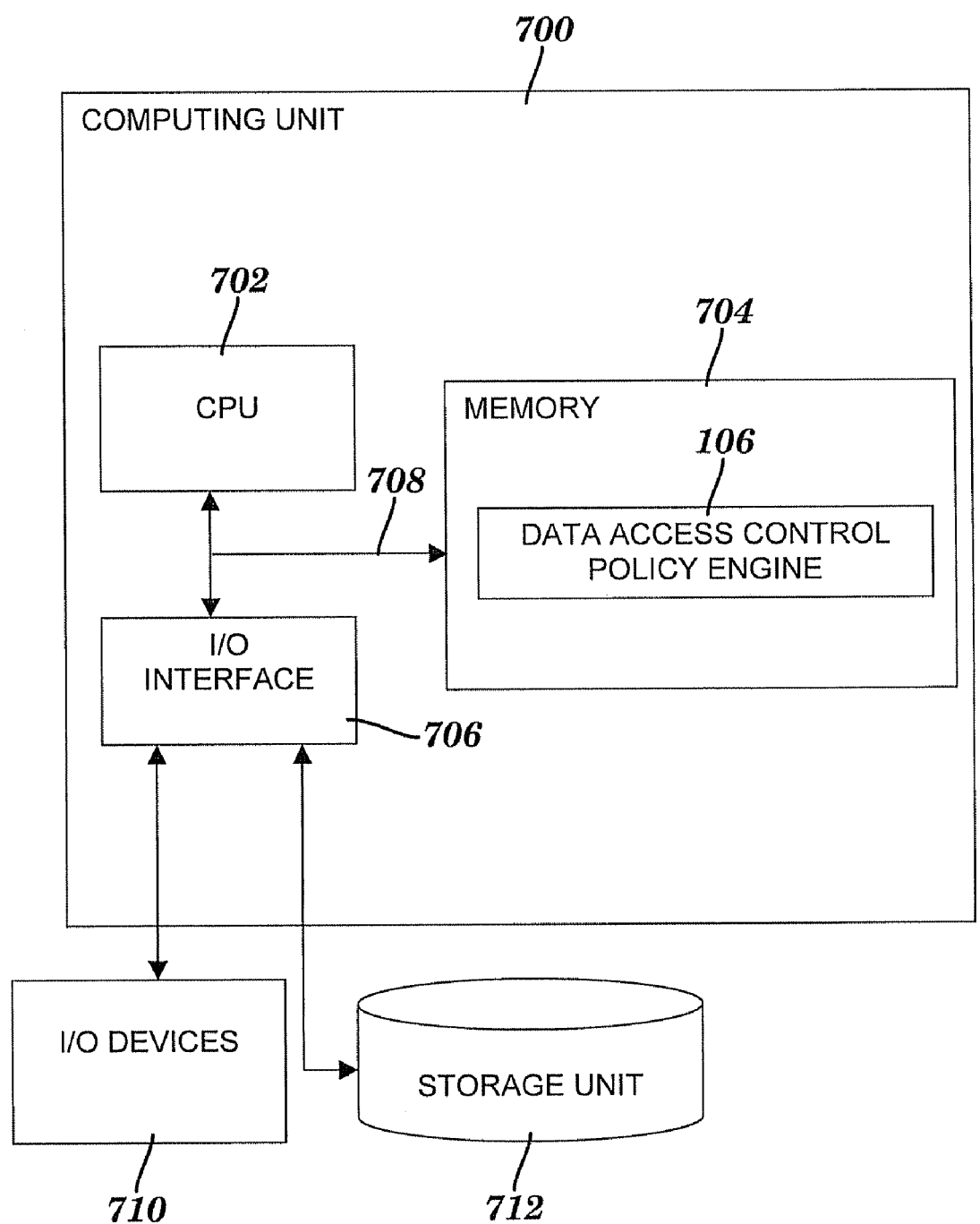
FIG. 7 is a computing system that includes the data access control policy engine of FIG. 1A and that implements the processes of FIGS. 2-4, in accordance with embodiments of the present invention.

FIG. 7 is a computing system that includes the data access control policy engine of FIG. 1A and that implements the processes of FIGS. 2-4, in accordance with embodiments of the present invention. Computing unit 700 generally comprises a central processing unit (CPU) 702, a memory 704, an input/output (I/O) interface 706, a bus 708, I/O devices 710 and a storage unit 712. CPU 702 performs computation and control functions of computing unit 700. CPU 702 may comprise a single processing unit, or be distributed across one or more processing units in one or more locations (e.g., on a client and server).

Memory 704 may comprise any known type of data storage and/or transmission media, including bulk storage, magnetic media, optical media, random access memory (RAM), read-only memory (ROM), a data cache, a data object, etc. Cache memory elements of memory 704 provide temporary storage of at least some program code in order to reduce the number of times code must be retrieved from bulk storage during execution. Storage unit 712 is, for example, a magnetic disk drive or an optical disk drive that stores data. Moreover, similar to CPU 702, memory 704 may reside at a single physical location, comprising one or more types of data storage, or be distributed across a plurality of physical systems in various forms. Further, memory 704 can include data distributed across, for example, a LAN, WAN or storage area network (SAN) (not shown).

I/O interface 706 comprises any system for exchanging information to or from an external source. I/O devices 710 comprise any known type of external device, including a display monitor, keyboard, mouse, printer, speakers, handheld device, printer, facsimile, etc. Bus 708 provides a communication link between each of the components in computing unit 700, and may comprise any type of transmission link, including electrical, optical, wireless, etc.

I/O interface 706 also allows computing unit 700 to store and retrieve information (e.g., program instructions or data) from an auxiliary storage device (e.g., storage unit 712). The auxiliary storage device may be a non-volatile storage device (e.g., a CD-ROM drive which receives a CD-ROM disk). Computing unit 700 can store and retrieve information from other auxiliary storage devices (not shown), which can include a direct access storage device (DASD) (e.g., hard disk or floppy diskette), a magneto-optical disk drive, a tape drive, or a wireless communication device.

Memory 704 includes program code for data access control policy engine 106. Further, memory 704 may include other systems not shown in FIG. 7, such as an operating system (e.g., Linux) that runs on CPU 702 and provides control of various components within and/or connected to computing unit 700.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 106 for use by or in connection with a computing unit 700 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 704, ROM, a rigid magnetic disk and an optical disk.

Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the method of controlling access to data via a data-centric security model. Thus, the present invention discloses a process for supporting computer infrastructure, comprising integrating, hosting, maintaining and deploying computer-readable code into a computing system (e.g., computing unit 700), wherein the code in combination with the computing unit is capable of performing a method of controlling access to data via a data-centric security model.

In another embodiment, the invention provides a business method that performs the process steps of the invention on a subscription, advertising and/or fee basis. That is, a service provider, such as a Solution Integrator, can offer to create, maintain, support, etc. a method of controlling access to data via a data-centric security model. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of controlling an access to data via a data-centric security model, comprising:

defining, via a computing system, a business data classification scheme as a hierarchy that includes a plurality of data classifications, said plurality of data classifications being aligned with a plurality of business operations in a many-to-one correspondence, wherein said business data classification scheme associates a data classification included in said plurality of data classifications with a set of security requirements that describes first security procedures for protecting an access to first data elements classified by said data classification;

automatically labeling, via said computing system, a data element with a data label, wherein said data label includes said data classification and said set of security requirements, wherein said data classification classifies said data element, and wherein said set of security requirements included in said data label specifies said first security procedures to protect an access to said data element;

said computing system receiving a first policy statement that specifies an action that provides said access to said data element, a data type of said data element, a role permitted to perform said action to access said data element of said data type, and a first sensitivity of said data element, wherein said first policy statement is based on first regulatory requirements;

subsequent to said receiving said first policy statement, said computing system generating a data control rule (DCR) as an enforceable statement in an access control policy language by automatically encoding said data classification and said first policy statement as said enforceable statement in said access control policy language;

subsequent to said generating said DCR, said computing system automatically determining a first set of security services is required to protect said access to said data element based on said data element being classified by said data classification that is encoded in said first DCR;

subsequent to determining said first set of security services, said computing system determining said first regulatory requirements are replaced by second regulatory requirements, said second regulatory requirements being a result of legislation;

subsequent to said determining said first regulatory requirements are replaced, said computing system receiving a second policy statement as a replacement of said first policy statement, wherein said second policy statement specifies said action that provides said access to said data element, said data type of said data element, said role permitted to perform said action to access said data element of said data type, and a second sensitivity of said data element, said second sensitivity being different from said first sensitivity, wherein said second policy statement is based on said second regulatory requirements;

said computing system automatically transforming said second policy statement into a second DCR by automatically encoding said data classification and said second policy statement as a second enforceable statement in said access control policy language, wherein said second enforceable statement is said second DCR;

subsequent to said automatically transforming said second policy statement into said second DCR, said computing system automatically determining a second set of security services is required to protect said access to said data element based on said second policy statement being said replacement of said first policy statement and said second policy statement and said data classification of said data element being encoded in said second DCR, said second set of security services being different from said first set of security services;

subsequent to said determining said second set of security services, said computing system receiving a data request that requests said access to said data element;

subsequent to said receiving said data request, said computing system determining said action is a permissible action based on said second DCR;

subsequent to said receiving said data request, said computing system determining said role is a permissible role based on said second DCR;

said computing system granting said access to said data element based on said action and said role being permissible based on said second DCR; and subsequent to said granting said access, said computing system accessing said data element by running said second set of security services to protect said access of said data element based on said second sensitivity included in said second policy statement that replaced said first policy statement, instead of by running said first set of security services to protect said access of said data element based on said first sensitivity included in said first policy statement.

2. The method of claim 1, further comprising identifying, via said computing system, one or more business requirements and said first regulatory requirements, wherein said one or more business requirements and said first regulatory requirements apply to a set of data, and wherein said set of data includes said data element.

3. The method of claim 2, further comprising consolidating, via said computing system, said one or more business requirements and said first regulatory requirements into said first set of security requirements.

4. The method of claim 1, wherein said generating said enforceable statement includes automatically encoding said data classification and said first policy statement as said enforceable statement in eXtensible Access Control Markup Language (XACML).

5. A computing system comprising a processor coupled to a computer-readable memory unit, said memory unit comprising a software application, said software application comprising instructions that when executed by said processor implement the method of claim 1.

6. A computer program product, comprising a computer readable storage medium having a computer readable program code stored therein, said computer readable program code containing instructions that when executed by a processor of a computing system implement a method for controlling an access to data via a data-centric security model, said method comprising:

defining a business data classification scheme as a hierarchy that includes a plurality of data classifications, said plurality of data classifications being aligned with a plurality of business operations in a many-to-one correspondence, wherein said business data classification scheme associates a data classification included in said plurality of data classifications with a set of security requirements that describes first security procedures for protecting an access to first data elements classified by said data classification;

automatically labeling a data element with a data label, wherein said data label includes said data classification and said set of security requirements, wherein said data classification classifies said data element, and wherein said set of security requirements included in said data label specifies said first security procedures to protect an access to said data element;

receiving a first policy statement that specifies an action that provides said access to said data element, a data type of said data element, a role permitted to perform said action to access said data element of said data type, and a first sensitivity of said data element, wherein said first policy statement is based on first regulatory requirements;

subsequent to said receiving said first policy statement, generating a data control rule (DCR) as an enforceable statement in an access control policy language by automatically encoding said data classification and said first policy statement as said enforceable statement in said access control policy language;

subsequent to said generating said DCR, automatically determining a first set of security services is required to protect said access to said data element based on said data element being classified by said data classification that is encoded in said first DCR;

subsequent to determining said first set of security services, determining said first regulatory requirements are replaced by second regulatory requirements, said second regulatory requirements being a result of legislation;

subsequent to said determining said first regulatory requirements are replaced, receiving a second policy statement as a replacement of said first policy statement, wherein said second policy statement specifies said action that provides said access to said data element, said data type of said data element, said role permitted to perform said action to access said data element of said data type, and a second sensitivity of said data element, said second sensitivity being different from said first sensitivity, wherein said second policy statement is based on said second regulatory requirements;

automatically transforming said second policy statement into a second DCR by automatically encoding said data classification and said second policy statement as a second enforceable statement in said access control policy language, wherein said second enforceable statement is said second DCR;

subsequent to said automatically transforming said second policy statement into said second DCR, automatically determining a second set of security services is required to protect said access to said data element based on said second policy statement being said replacement of said first policy statement and said second policy statement and said data classification of said data element being encoded in said second DCR, said second set of security services being different from said first set of security services;

subsequent to said determining said second set of security services, receiving a data request that requests said access to said data element;

subsequent to said receiving said data request, determining said action is a permissible action based on said second DCR;

subsequent to said receiving said data request, determining said role is a permissible role based on said second DCR;

granting said access to said data element based on said action and said role being permissible based on said second DCR; and subsequent to said granting said access, accessing said data element by running said second set of security services to protect said access of said data element based on said second sensitivity included in said second policy statement that replaced said first policy statement, instead of by running said first set of security services to protect said access of said data element based on said first sensitivity included in said first policy statement.

7. The program product of claim 6, wherein said method further comprises identifying one or more business requirements and said first regulatory requirements, wherein said one or more business requirements and said first regulatory requirements apply to a set of data, and wherein said set of data includes said data element.

8. The program product of claim 7, wherein said method further comprises consolidating said one or more business requirements and said first regulatory requirements into said first set of security requirements.

9. The program product of claim 6, wherein said generating said enforceable statement includes automatically encoding said data classification and said first policy statement as said enforceable statement in eXtensible Access Control Markup Language (XACML).

10. A process for supporting computing infrastructure, said process comprising providing at least one support service for at least one of creating, integrating, hosting, maintaining, and deploying computer-readable code in a computing system, wherein the code in combination with the computing system is capable of performing a method of controlling an access to data via a data-centric security model, said method comprising:

defining, via a computing system, a business data classification scheme as a hierarchy that includes a plurality of data classifications, said plurality of data classifications being aligned with a plurality of business operations in a many-to-one correspondence, wherein said business data classification scheme associates a data classification included in said plurality of data classifications with a set of security requirements that describes first security procedures for protecting an access to first data elements classified by said data classification;

automatically labeling, via said computing system, a data element with a data label, wherein said data label includes said data classification and said set of security requirements, wherein said data classification classifies said data element, and wherein said set of security requirements included in said data label specifies said first security procedures to protect an access to said data element;

said computing system receiving a first policy statement that specifies an action that provides said access to said data element, a data type of said data element, a role permitted to perform said action to access said data element of said data type, and a first sensitivity of said data element, wherein said first policy statement is based on first regulatory requirements;

subsequent to said receiving said first policy statement, said computing system generating a data control rule (DCR) as an enforceable statement in an access control policy language by automatically encoding said data classification and said first policy statement as said enforceable statement in said access control policy language;

subsequent to said generating said DCR, said computing system automatically determining a first set of security services is required to protect said access to said data element based on said data element being classified by said data classification that is encoded in said first DCR;

subsequent to determining said first set of security services, said computing system determining said first regulatory requirements are replaced by second regulatory requirements, said second regulatory requirements being a result of legislation;

subsequent to said determining said first regulatory requirements are replaced, said computing system receiving a second policy statement as a replacement of said first policy statement, wherein said second policy statement specifies said action that provides said access to said data element, said data type of said data element, said role permitted to perform said action to access said data element of said data type, and a second sensitivity of said data element, said second sensitivity being different from said first sensitivity, wherein said second policy statement is based on said second regulatory requirements;

said computing system automatically transforming said second policy statement into a second DCR by automatically encoding said data classification and said second policy statement as a second enforceable statement in said access control policy language, wherein said second enforceable statement is said second DCR;

subsequent to said automatically transforming said second policy statement into said second DCR, said computing system automatically determining a second set of security services is required to protect said access to said data element based on said second policy statement being said replacement of said first policy statement and said second policy statement and said data classification of said data element being encoded in said second DCR, said second set of security services being different from said first set of security services;

subsequent to said determining said second set of security services, receiving a data request that requests said access to said data element;

subsequent to said receiving said data request, said computing system determining said action is a permissible action based on said second DCR;

subsequent to said receiving said data request, said computing system determining said role is a permissible role based on said second DCR;

said computing system granting said access to said data element based on said action and said role being permissible based on said second DCR; and subsequent to said granting said access, accessing said data element by running said second set of security services to protect said access of said data element based on said second sensitivity included in said second policy statement that replaced said first policy statement, instead of by running said first set of security services to protect said access of said data element based on said first sensitivity included in said first policy statement.

11. The process of claim 10, wherein said method further comprises identifying, via said computing system, one or more business requirements and said first regulatory requirements, wherein said one or more business requirements and said first regulatory requirements apply to a set of data, and wherein said set of data includes said data element.

12. The process of claim 11, wherein said method further comprises consolidating, via said computing system, said one or more business requirements and said first regulatory requirements into said first set of security requirements.

13. The method of claim 1, wherein said automatically determining said second set of security services is required to protect said access to said data element includes determining said second set of security services as functions that provide a secure transport of said data element during said access.

14. The program product of claim 6, wherein said automatically determining said second set of security services is required to protect said access to said data element includes determining said second set of security services as functions that provide a secure transport of said data element during said access.

15. The process of claim 10, wherein said automatically determining said second set of security services is required to protect said access to said data element includes determining said second set of security services as functions that provide a secure transport of said data element during said access.

* * * * *